United States Patent Office 2,813,084
Patented Nov. 12, 1957

2,813,084

POLYCHLOROPRENE-PALM OIL PACKING COMPOSITION

George P. Leistensnider, Somerville, N. J., assignor to Johns-Manville Corporation, New York, N. Y., a corporation of New York No Drawing. Application November 6, 1953, Serial No. 390,730

8 Claims. (Cl. 260—23.7)

This invention relates to the manufacture of molded flexible packings, and more particularly to a novel composition for such flexible or plastic packings.

Various materials and compositions have been employed to form molded packings for rotary or reciprocating rods, shafts, and the like. Often such packings are provided in the form of strands or ropes of circular or polygonal cross-section. Normally the strands or ropes are packaged in coil or spiral form, and for service, sections are cut from the package and positioned around a shaft to form a ring packing therefor. Commonly, a plurality of such ring packings are used, and the joints formed by the individual rings are staggered to prevent forming a path for fluid leakage.

Conventionally, such molded packings are formed having a binder matrix containing inert fillers, and solid and liquid lubricants as, for example, graphite and mineral oil, respectively. The binder for such conventional packings normally comprises an elastomer, as for example, a synthetic or natural rubber.

While packings formed of such prior compositions have been somewhat successful in service, they suffer two major disadvantages in that they generally exhibit poor shelf-life, that is, harden substantially before being put into service, and exhibit a tendency to harden to an objectionable degree during service. It is immediately apparent that packings formed of such compositions should retain their flexibility, plasticity, and softness in order to allow proper seating of the packings when placed in service and to preserve their necessary sealing function while in use.

Accordingly, it is an object of this invention to provide a composition for molded plastic packings, which have good shelf-life and will not tend to harden during service.

It is an additional object of this invention to provide a plastic packing composition which has good lubricating characteristics.

It is a further object of this invention to provide a flexible, plastic packing which exhibits good break-in characteristics.

With the above objects and features in view, the invention consists in the molded composition packing hereinafter described and more particularly defined in the accompanying claims.

The preferred flexible molded composition packings formed in accordance with this invention generally comprise a substantial proportion of inert fillers and lubricants in a polychloroprene elastomer binder matrix which contains a substantial proportion of palm oil which will serve the function of both a fluid lubricant and a softener. Generally, the inert fillers and lubricants employed in the molded composition packings of this invention are similar in composition to, and used in amount comparable to, those conventionally employed in such products. The critical aspect of this invention does not reside in the specific fillers and lubricants used in the packing, but rather in the provision of a binder matrix comprising a specific elastomer and a specific softener in fixed definite proportions to each other and, in turn, to the entire molded composition.

The inert fillers which may be employed in molded packings of the type herein defined may comprise staple reinforcing fibers, such as asbestos, cellulose fibers and flocks, etc.; particulate fillers such as mica, diatomaceous earth, etc.; or any other filler which will not have an abrasive, corrosive or otherwise adverse effect upon the packing or the surfaces which contact the packing. Along with the inert fillers, the compositions normally contain substantial proportions of solid lubricating fillers such as graphite, carbon, metallic soaps such as zinc stearate, etc. In addition to the other particulate fillers and lubricants, it is often desirable to incorporate in the molded packing substantial proportions of metallic particles or filaments such as wires, chips or ribbons of soft metals such as lead, zinc, copper, etc. These fillers serve the function of form retention in the packing to prevent extrusion or movement thereof from its operating position. The filler content of the packings of this invention preferably comprises approximately 30 to 86% by weight of the molded body.

As heretofore indicated, the desirable characteristics of the molded packing of this invention, such as its excellent shelf-life, easy break-in characteristics and lubricating properties, are due to the use of a binder matrix of a polychloroprene elastomer which contains at least approximately 50% and preferably no more than 100% by weight of the elastomer of a palm oil softener and lubricant. It is only in the use of the specific combination of the polychloroprene elastomer with the palm oil in amount at least approximately 50% by weight of the elastomer that molded products having the recited properties can be obtained. The uncured molding composition containing the palm oil, polychloroprene elastomer, and fillers and lubricants, is readily mixed and is extrudable without the loss of cohesive properties in the binder matrix. This extremely important characteristic is particularly related to the polychloroprene elastomer and palm oil, since the necessary cohesive properties for extrusion are not obtained in the composition if materials such as mineral oil, greases, paraffin, etc., are used to replace the palm oil content in the molding composition. After forming the molding composition hereinbefore defined to the desired configuration, and after vulcanization of the packing with or without vulcanizing accelerators, it remains soft and resilient. After standard aging test procedures, the packing of this invention does not become hard and brittle as do similar packings without the palm oil polychloroprene elastomer binder matrix after relatively short periods of shelf-storage.

Any suitable mixing and molding procedure may be employed to form the packings of this invention. Preferably, the inert fillers, such as asbestos, are blended with the polychloroprene elastomer and the palm oil before the dry lubricants are added to the mixture. After mixing of all ingredients the composition is extruded or otherwise molded to the desired configuration, and the products obtained are vulcanized to the desired stage.

The following are examples of molded composition packings formed in accordance with this invention and their general method of preparation. It is understood, of course, that the composition of and method for producing these composition packings are exemplary and are not to be considered to limit the invention to the particular compositions and operating conditions outlined. In the examples, all percentages are indicated by weight.

Example I

A flexible molded composition packing was formed from the composition of:

| | Percent |
|---|---|
| Polychloroprene elastomer | 12 |
| Palm oil | 12 |
| Asbestos fiber | 35 |
| Graphite | 41 | by initially mixing the asbestos fiber and polychloroprene elastomer and then adding thereto the palm oil. At this point, the graphite was added and mixing continued until a homogenous molding composition was formed. The mixture was then extruded to a substantially square cross-section and vulcanized without further pressure at a temperature of approximately 212° F. The packing obtained exhibited good flexibility and plasticity, and did not harden to any substantial degree during standard ageing test procedures. When placed in service position, the packing had proper physical characteristics to become properly seated without a break-in period of any substantial length.

Example II

A flexible molded composition packing was fabricated in the same manner as the packing of the preceding example from a composition of:

| | Percent |
|---|---|
| Polychloroprene elastomer | 8 |
| Palm oil | 6 |
| Asbestos fiber | 23 |
| Graphite | 30 |
| Lead wire (¾″ length) | 33 |

This packing exhibited similar characteristics to the preceding and also exhibited an excellent resistance to movement or extrusion from its service position.

It will be understood that the details given herein are for the purpose of illustration, not restriction, and that variations within the spirit of the invention are intended to be included in the scope of the appended claims.

What I claim is:

1. A flexible, molded composition packing which comprises filler material in amount within the approximate range of 30%–86% by weight in a matrix comprising the reaction product resulting from the in situ heat vulcanization of polychloroprene elastomer and palm oil in amount within the approximate range 50%–100% by weight of the elastomer.

2. A flexible, molded composition packing which comprises inert fillers and solid lubricating fillers, in amount approximately 30%–86% by weight, in a matrix comprising the reaction product resulting from the in situ heat vulcanization of a polychloroprene elastomer and palm oil in amount approximately 50%–100% by weight of the elastomer.

3. A flexible, molded composition packing which comprises approximately 30%–86% by weight of staple reinforcing fibers and solid particulate lubricating fillers in a matrix comprising the reaction product resulting from the in situ heat vulcanization of a polychloroprene elastomer and palm oil in amount approximately 50%–100% by weight of the elastomer.

4. A flexible, molded composition packing which comprises approximately 30%–86% by weight of staple reinforcing fibers, solid particulate lubricating fillers, and soft metal fillers, in a matrix comprising the reaction product resulting from the in situ heat vulcanization of a polychloroprene elastomer and palm oil in amount approximately 50%–100% by weight of the elastomer.

5. A flexible, molded composition packing which comprises approximately 30%–86% by weight of asbestos fiber and graphite, in a matrix comprising the reaction product resulting from the in situ heat vulcanization of a polychloroprene elastomer and palm oil in amount approximately 50%–100% by weight of the elastomer.

6. A flexible, molded composition packing which comprises the in situ heat vulcanization product of the following ingredients in the recited approximate proportions by weight:

| | Percent |
|---|---|
| Asbestos fiber | 35 |
| Graphite | 41 |
| Polychloroprene elastomer | 12 |
| Palm oil | 12 |

7. A flexible, molded composition packing which comprises the in situ heat vulcanization product of the following ingredients in the recited approximate proportions by weight:

| | Percent |
|---|---|
| Asbestos fiber | 23 |
| Graphite | 30 |
| Polychloroprene elastomer | 8 |
| Palm oil | 6 |
| Lead wire (¾″ lengths) | 33 |

8. A lastingly flexible, plastic molded composition which comprises approximately 30%–86% by weight of filler material in a matrix comprising the reaction product resulting from the in situ heat vulcanization of a polychloroprene elastomer and palm oil in amount approximately 50%–100% by weight of the elastomer.

References Cited in the file of this patent

UNITED STATES PATENTS

| 2,099,241 | Stewart | Nov. 16, 1937 |
| 2,099,242 | Stewart | Nov. 16, 1937 |

OTHER REFERENCES

Dupont: Report No. 42-2, The Compounding and Processing of Neoprene Type G. N., May 1942, page 9. (Copy in Division 50.)